(12) United States Patent
Lee et al.

(10) Patent No.: US 7,944,510 B2
(45) Date of Patent: May 17, 2011

(54) BROADCAST RECEIVING APPARATUS FOR CAPTURING BROADCAST SIGNAL AND METHOD THEREOF

(75) Inventors: Kwang-ho Lee, Anyang-si (KR); Seong-nam Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1326 days.

(21) Appl. No.: 11/475,093

(22) Filed: Jun. 27, 2006

(65) Prior Publication Data

US 2007/0103593 A1    May 10, 2007

(30) Foreign Application Priority Data

Nov. 7, 2005  (KR) .................. 10-2005-0106001

(51) Int. Cl.
*H04N 5/46* (2006.01)
*H04N 9/74* (2006.01)
*H04N 5/44* (2011.01)

(52) U.S. Cl. ........ 348/725; 348/556; 348/558; 348/559; 348/581

(58) Field of Classification Search .................. 348/555, 348/556, 558, 559, 581
See application file for complete search history.

(56) References Cited

U.S. PATENT DOCUMENTS

| | | | |
|---|---|---|---|
| 5,121,476 A * | 6/1992 | Yee | 348/559 |
| 5,486,871 A * | 1/1996 | Filliman et al. | 348/558 |
| 5,959,687 A * | 9/1999 | Dinwiddie et al. | 348/564 |
| 6,052,155 A * | 4/2000 | Cherrick et al. | 348/565 |
| 6,215,523 B1 * | 4/2001 | Anderson | 348/333.05 |
| 6,229,574 B1 * | 5/2001 | Han | 348/555 |
| 6,297,851 B1 * | 10/2001 | Taubman et al. | 348/572 |
| 6,683,655 B2 * | 1/2004 | Han | 348/581 |
| 6,870,573 B2 * | 3/2005 | Yeo et al. | 348/569 |
| 7,139,033 B2 * | 11/2006 | Sun | 348/559 |
| 7,542,097 B2 * | 6/2009 | Suito | 348/555 |
| 2004/0160532 A1 * | 8/2004 | Sun | 348/559 |
| 2005/0052469 A1 | 3/2005 | Crosby et al. | |
| 2005/0111549 A1 * | 5/2005 | Kim et al. | 375/240.12 |
| 2005/0122430 A1 * | 6/2005 | Lee et al. | 348/559 |
| 2006/0092188 A1 * | 5/2006 | Mamba et al. | 345/698 |
| 2006/0158571 A1 * | 7/2006 | Tsunoda et al. | 348/734 |

FOREIGN PATENT DOCUMENTS

| | | | |
|---|---|---|---|
| JP | 2005-080223 A | | 3/2005 |
| KR | 10-2001-0037595 A | | 5/2001 |
| KR | 2002-0071962 A | | 9/2002 |
| KR | 1020060030235 | | 4/2006 |
| KR | 1020060021975 A | | 9/2006 |

* cited by examiner

*Primary Examiner* — Brian Yenke
(74) *Attorney, Agent, or Firm* — Sughrue Mion, PLLC

(57) ABSTRACT

A broadcast receiving apparatus, and method, for capturing a broadcast signal, the apparatus including a signal processor to receive broadcast signals and process the broadcast signals, a controller to capture a certain frame data from the broadcast signals processed by the signal processor, check an input resolution of the broadcast signals, and decide whether to perform a down-scaling with respect to the captured frame data, a down-scaler to down-scale the frame data which is decided by the controller to be down-scaled, and a storage unit to store the down-scaled frame data. Accordingly, an image can be captured and a captured frame data can be stored without being degraded, preventing memory consumption.

16 Claims, 4 Drawing Sheets

BROADCAST RECEIVING APPARATUS FOR CAPTURING BROADCAST SIGNAL AND METHOD THEREOF

CROSS-REFERENCE TO RELATED APPLICATIONS

This application claims priority from Korean Patent Application No. 10-2005-106001, filed on Nov. 7, 2005, in the Korean Intellectual Property Office, the disclosure of which is incorporated herein by reference in its entirety.

BACKGROUND OF THE INVENTION

1. Field of the Invention

Methods and apparatuses consistent with the present invention relate to capturing a broadcast signal, and more particularly, to capturing the frame data of a broadcast signal, adjusting a resolution of the captured frame data and then storing the captured frame data.

2. Description of the Related Art

With the development of electronic communication technology, a digital broadcasting system, as well as an analog broadcasting system, has been actively developed and widely used. Accordingly, a combined broadcast receiving apparatus having the capability of receiving both an analog broadcast and a digital broadcast has come into increased use in recent years.

A recently developed broadcast receiving apparatus additionally includes various functions that do not exist in any conventional device. For example, the broadcast receiving apparatus has a function of capturing a broadcast signal. The broadcast signal capturing function refers to a function of capturing an image that a viewer wants to record at the time when the image is displayed and storing the captured still image.

Upon receiving a capture command, the broadcast receiving apparatus records a frame data currently displayed on a screen as it is and stores the same. The frame data is processed from the original broadcast signal data and is scaled to an output resolution. The frame data constitutes one frame. Accordingly, the captured frame data has the same resolution as the output resolution.

However, the conventional broadcast receiving apparatus excessively consumes memory since the frame data is scaled to the output resolution and then captured. For example, if a frame data having a chroma format of 4:4:4 is scaled to an output resolution 1080i and then stored, the broadcast receiving apparatus takes approximately 5.93MB of memory. Accordingly, the broadcast receiving apparatus requires a high capacity memory.

In an attempt to reduce memory consumption, the captured frame data is uniformly down-scaled and stored. In this case, however, the quality of image may deteriorate.

SUMMARY OF THE INVENTION

An aspect of the present invention is to provide a broadcast receiving apparatus, which down-scales a frame data captured from a received broadcast signal if an input resolution is lower than an output resolution and thereby can reduce memory consumption without causing image degradation.

The above aspect is achieved by providing a broadcast receiving apparatus, including a signal processor that receives broadcast signals and process the broadcast signals, a controller that captures a certain frame data from the broadcast signals processed by the signal processor, checks an input resolution of the broadcast signals, and decides whether to perform a down-scaling with respect to the captured frame data, a down-scaler that down-scales the frame data which is decided by the controller to be down-scaled, and a storage unit that stores the down-scaled frame data.

The broadcast receiving apparatus may further include a scaler that scales the broadcast signals processed by the signal processor to an output resolution, and a frame buffer that stores the scaled broadcast signals in sequence. In this case, the controller may capture a certain frame data from the broadcast signals stored in the frame buffer.

The controller may receive the input resolution from the signal processor and compare the input resolution with the output resolution, and if the input resolution is lower than the output resolution, the controller controls the down-scaler to down-scale the captured frame data to the input resolution.

If the input resolution is higher than the output resolution, the controller may store the captured frame data in the storage unit without down-scaling it.

The signal processor may include a digital receiver that receives digital broadcast signals, a digital signal processor that processes the digital broadcast signals, detects an input resolution of the digital broadcast signals, and transmits the detected input resolution to the controller, an analog receiver that receives analog broadcast signals, and an analog signal processor that processes the analog broadcast signals, detects an input resolution of the analog broadcast signals, and transmits the detected input resolution to the controller. Accordingly, both of analog broadcast signals and digital broadcast signals can be captured.

The broadcast receiving apparatus may further include an input unit that inputs a capture command with respect to the broadcast signals, and the controller may capture a frame data corresponding to a point of time when the capture command is input, from the frame buffer, and decide whether to down-scale the captured frame data.

Another aspect of the present invention is also achieved by providing a method for capturing a broadcast signal, including (a) receiving broadcast signals and detecting an input resolution, (b) capturing a certain frame data from the broadcast signals, (c) checking an input resolution of the broadcast signals and deciding whether to perform a down-scaling with respect to the captured frame data, (d) if the down-scaling is decided to be performed, down-scaling the captured frame data, and (e) storing the down-scaled frame data to a predetermined storage unit.

The method may further include processing the received broadcast signals, scaling the processed broadcast signals to an output resolution, and storing the scaled broadcast signals in a frame buffer in sequence.

The operation (c) may include comparing the input resolution with the output resolution, and if the input resolution is lower than the output resolution, deciding to perform a down-scaling with respect to the captured frame data, and if the input resolution is higher than the output resolution, deciding not to perform a down-scaling.

The method may further include storing the captured frame data in the storage unit without down-scaling it if the down-scaling is not decided to be performed with respect to the captured frame data.

The operation (a) may receive either an analog broadcast signal or a digital broadcast signal and detect an input resolution of the received broadcast signal.

If a capture command is input, the operation (b) may capture a frame data corresponding to a point of time when the capture command is input, from the frame data of the broadcast signals stored in the frame buffer.

BRIEF DESCRIPTION OF THE DRAWINGS

The above and other aspects of the present invention will become more apparent by describing exemplary embodiments of the present invention with reference to the accompanying drawings, in which.

DETAILED DESCRIPTION OF EXEMPLARY EMBODIMENTS

Hereinafter, exemplary embodiments of the present invention will now be described in greater detail with reference to the accompanying drawings.

Figure 1:
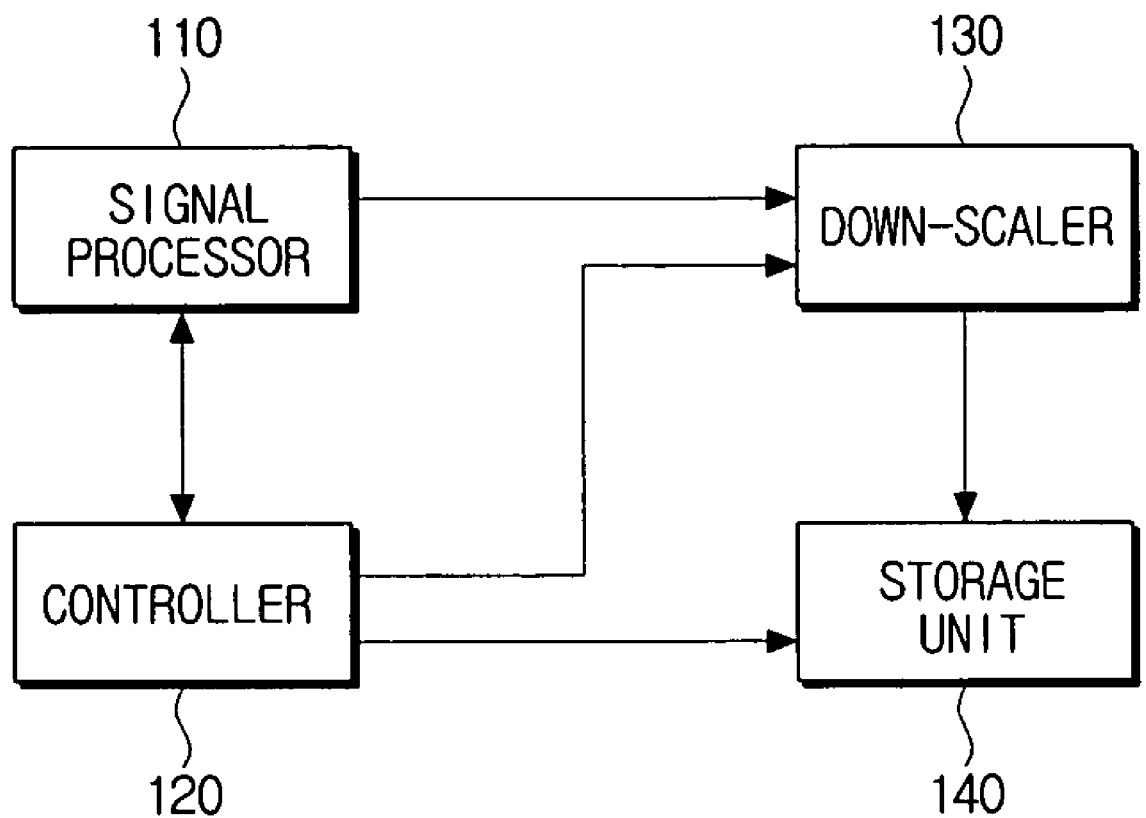
FIG. 1 is a block diagram illustrating a broadcast receiving apparatus according to an exemplary embodiment of the present invention.

FIG. 1 is a view illustrating a broadcast receiving apparatus according to an exemplary embodiment of the present invention. Referring to FIG. 1, the broadcast receiving apparatus comprises a signal processor 110, a controller 120, a down-scaler 130, and a storage unit 140.

The signal processor 110 receives and processes broadcast signals. The signal processor 110 detects an input resolution of the broadcast signals and transmits it to the controller 120.

The controller 120 functions to capture a certain frame data from the broadcast signals which are processed by the signal processor 110. Also, the controller 120 compares the input resolution provided by the signal processor 110 with an output resolution of the broadcast receiving apparatus to decide whether to perform a down-scaling operation. More specifically, if the input resolution is lower than the output resolution, the controller 120 decides to perform a down-scaling operation, and otherwise, the controller 120 decides not to perform a down-scaling operation.

The down-scaler 130 down-scales the captured frame data which is decided by the controller 120 to be down-scaled. More specifically, the down-scaling operation is performed by removing pixels in a certain area, or removing a pixel having a value such that a pixel value difference between the pixel and its neighboring pixel is less than a predetermined threshold. Accordingly, the resolution of the captured frame data is adjusted to the input resolution.

The storage unit 140 stores the down-scaled frame data, and accordingly, can reduce consumption of capacity of the storage unit 140.

Figure 2:
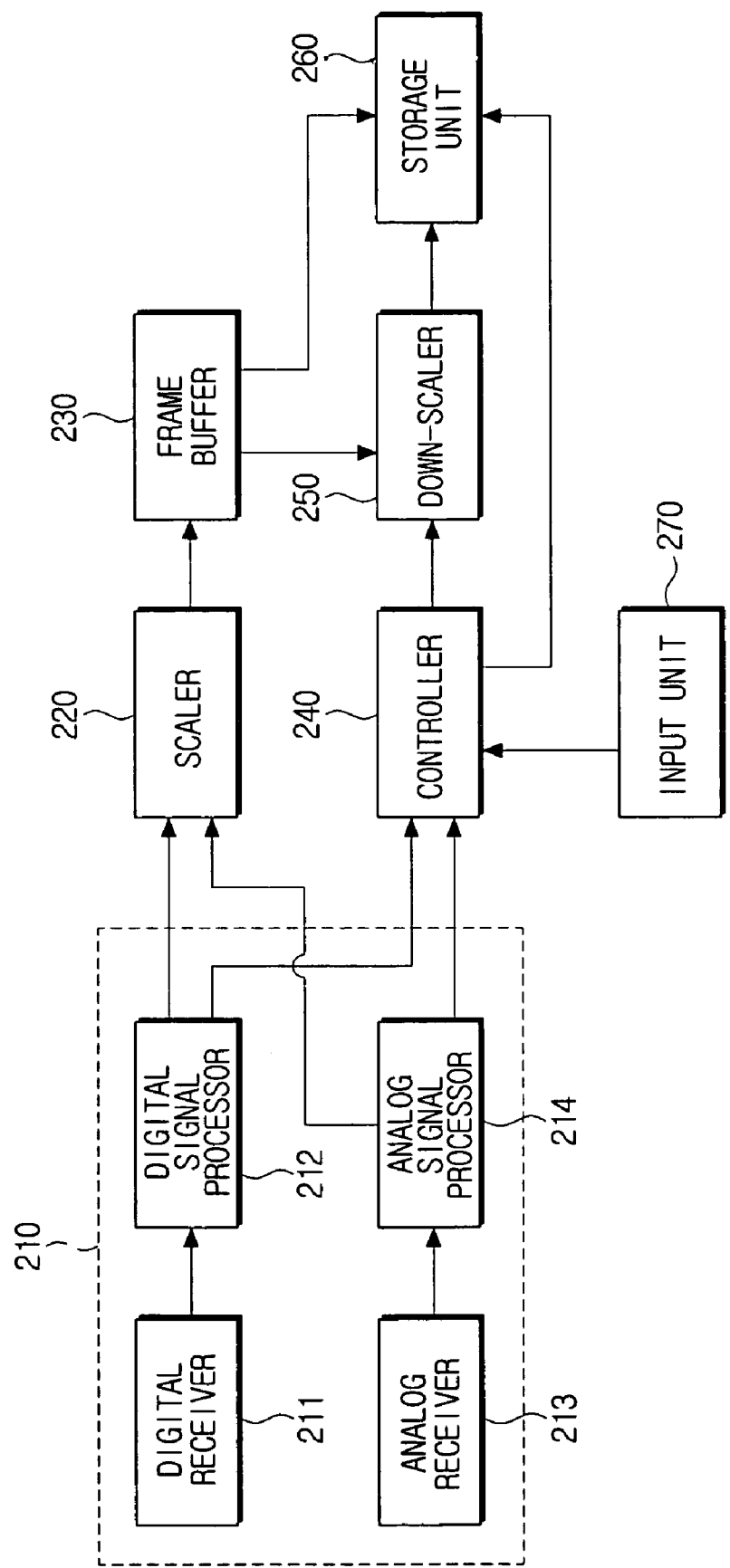
FIG. 2 is a block diagram illustrating a broadcast receiving apparatus according to an exemplary embodiment of the present invention.

FIG. 2 is a block diagram illustrating a broadcast receiving apparatus according to another exemplary embodiment of the present invention. Referring to FIG. 2, the broadcast receiving apparatus comprises a signal processor 210, a scaler 220, a frame buffer 230, a controller 240, a down-scaler 250, a storage unit 260, and an input unit 270.

The signal processor 210 comprises a digital receiver 211, a digital signal processor 212, an analog receiver 213, and an analog signal processor 214. The digital receiver 211 receives a digital signal and transmits it to the digital signal processor 212. The digital signal processor 212 performs a signal-processing such as decoding and multiplexing with respect to the digital signal and outputs the processed signal to the scaler 220. The digital signal processor 212 also detects input resolution information recorded on an elementary stream (ES) of the digital signal and transmits the detected input resolution information to the controller 240.

The analog receiver 213 receives an analog signal and transmits it to the analog signal processor 214. The analog signal processor 214 performs a signal processing such as analog to digital (AD) converting with respect to the analog signal and outputs the processed signal to the scaler 220. In this case, the analog signal processor 214 detects an input resolution by detecting the number of pixels between horizontal sync signals of the analog signal and the number of lines between vertical sync signals. The detected input resolution information is transmitted to the controller 240.

The scaler 220 scales the broadcast signals that are processed by the digital signal processor 212 and the analog signal processor 214. More specifically, the scaler 220 scales image data of the broadcast signals to an output resolution. The scaled image data i.e. the scaled broadcast signals are stored in the frame buffer 230 in sequence.

The controller 240 decides whether to perform a down-scaling based on the input resolution of the broadcast signals transmitted from the digital signal processor 212 and the analog signal processor 214. More specifically, if the input resolution is lower than an output resolution of the broadcast receiving apparatus as a result of comparison, the controller 240 decides to perform a down-scaling, and if the input resolution is higher than the output resolution, the controller 240 decides not to perform a down-scaling.

If the down-scaling is decided to be performed, the controller 240 captures a frame data stored in the frame buffer 230 and controls the down-scaler 250 to down-scale the captured frame data to the output resolution. The down-scaled frame data is stored in the storage unit 260. As a result, a waste of storage unit consumption can be prevented.

On the other hand, if the down-scaling is not decided to be performed, the controller 240 captures the original frame data stored in the frame buffer without down-scaling and controls the storage unit 260 to store the captured frame data. In other words, a high-resolution broadcast signal is not down-scaled and stored as it is so that an image can be prevented from being degraded.

The input unit 270 receives a capture command. More specifically, when a user inputs a capture command by using a button provided on a body of the broadcast receiving apparatus or a remote controller, the input unit 270 informs the controller 240 of this. The controller 240 captures a frame data, which is broadcasted at the time when the capture command is input, from the frame buffer 230, and down-scales the frame data or stores it in the storage unit 260 without down-scaling. Accordingly, a picture that a user wants to capture is stored as a still image.

Figure 3:
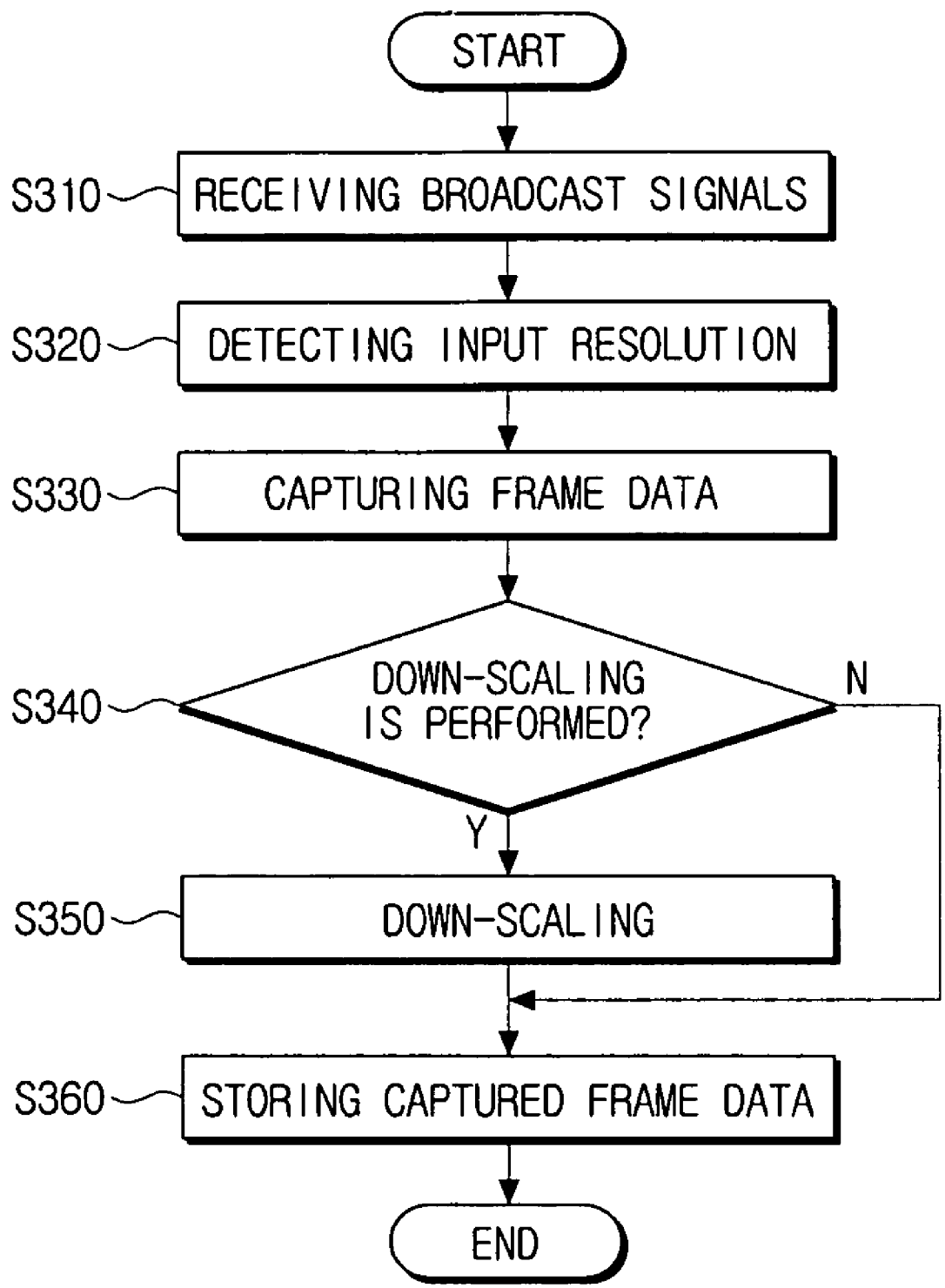
FIG. 3 is a flowchart illustrating a method for capturing a broadcast signal according to an exemplary embodiment of the present invention.

FIG. 3 is a flowchart illustrating a method for capturing a broadcast signal according to an exemplary embodiment of the present invention. Referring to FIG. 3, when broadcast signals are received at operation S310, an input resolution of the received broadcast signals is detected at operation S320. In this case, the broadcast signals may be either digital broadcast signals or analog broadcast signals. If the broadcast signals are digital broadcast signals, the input resolution may be read out from an elementary stream (ES), and if the broadcast signals are analog broadcast signals, the input resolution may be calculated by checking a horizontal sync signal and a vertical sync signal.

If a capture command is input, a frame data corresponding to a currently broadcasted picture is captured at operation S330. It is decided whether a down-scaling operation is performed with respect to the captured frame data at operation S340. More specifically, if the input resolution is lower than an output resolution as a result of comparison, the down-scaling is decided to be performed, and if the input resolution is higher than the output resolution, the down-scaling is not decided to be performed.

If the down-scaling is decided to be performed, the captured frame data is down-scaled at operation S350 and stored at operation S360. On the other hand, if the down-scaling is not decided to be performed, the captured frame data is stored without being down-scaled at operation S360.

Figure 4:
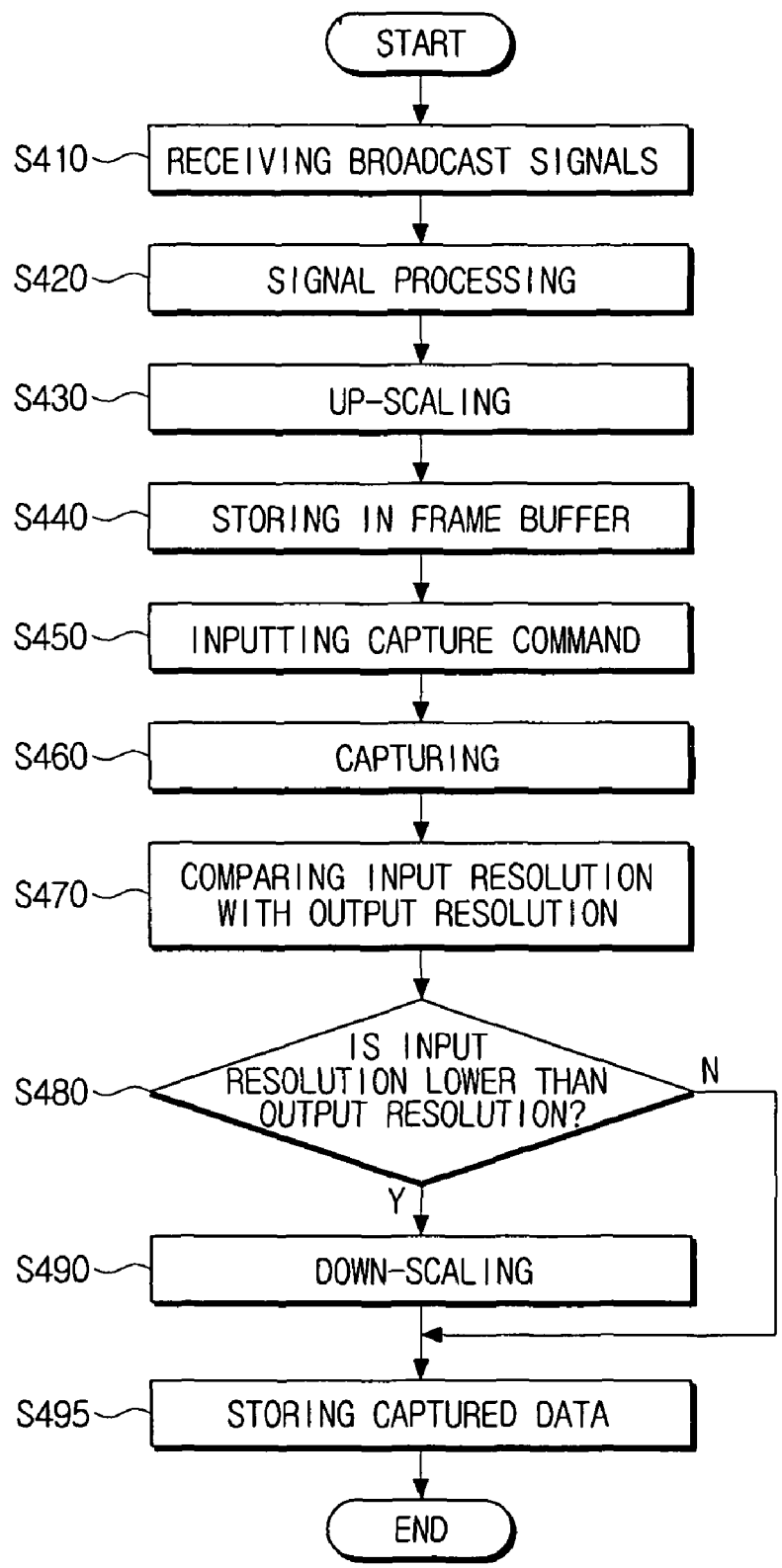
FIG. 4 is a flowchart illustrating the method for capturing a broadcast signal of FIG. 3 in detail.

FIG. 4 is a flowchart illustrating the method for capturing a broadcast signal of FIG. 3 in detail. Referring to FIG. 4, if broadcast signals are received at operation S410, the broadcast signals are processed, for example, are decoded or multiplexed, at operation S420, and are up-scaled to an output resolution at operation S430. The up-scaled data are stored in the frame buffer at operation S440 and displayed on a screen in sequence.

When a capture command is input at operation S450, a frame data corresponding to a picture displayed at the time when the capture command is input is captured at operation S460. Then, an input resolution is compared with the output resolution at operation S470.

If the input resolution is lower than the output resolution at operation S480, the captured frame data is down-scaled at operation S490 and stored in a certain memory at operation S495. If the input resolution is higher than the output resolution at operation S480, the captured frame data is not down-scaled and directly is stored at operation S490. Accordingly, a user captures a picture that the user wants and stores it as a still image.

According to the present invention as described above, the broadcast receiving apparatus decides whether to perform a down-scaling operation based on the input resolution of the broadcast signal, in capturing a certain frame of the broadcast signal. That is, if a frame data has a low input resolution, the broadcast receiving apparatus down-scales the frame data and then stores it, and if a frame data has a high input resolution, the broadcast receiving apparatus stores the frame data without down-scaling it. As a result, an image can be captured without being degraded and memory consumption can be prevented.

The foregoing embodiments are merely exemplary and are not to be construed as limiting the present invention. Many alternatives, modifications, and variations will be apparent to those skilled in the art.

What is claimed is:

1. A broadcast receiving apparatus, comprising:
 a signal processor which receives broadcast signals and processes the broadcast signals;
 a controller which captures a certain frame data from the broadcast signals processed by the signal processor, checks an input resolution of the broadcast signals, and decides to perform a down-scaling with respect to the captured frame data if the input resolution of the broadcast signals corresponding to the captured frame data is lower than an output resolution of the broadcast receiving apparatus;
 a down-scaler which down-scales the frame data which is decided by the controller to be down-scaled; and
 a storage unit which stores the down-scaled frame data,
 wherein, if the input resolution is higher than the output resolution, the controller stores the captured frame data in the storage unit without down-scaling it.

2. The broadcast receiving apparatus as claimed in claim 1, further comprising:
 a scaler which scales the broadcast signals processed by the signal processor to the output resolution; and
 a frame buffer which stores the scaled broadcast signals in sequence,
 wherein the controller captures the certain frame data from the broadcast signals stored in the frame buffer.

3. The broadcast receiving apparatus as claimed in claim 2, wherein the controller receives the input resolution from the signal processor and compares the input resolution with the output resolution, and if the input resolution is lower than the output resolution, the controller controls the down-scaler to down-scale the captured frame data to the input resolution.

4. The broadcast receiving apparatus as claimed in claim 2, further comprising an input unit which inputs a capture command with respect to the broadcast signals, wherein the controller captures a frame data, corresponding to a point of time when the capture command is input, from the frame buffer and decides whether to down-scale the captured frame data.

5. The broadcast receiving apparatus as claimed in claim 1, wherein the signal processor comprises:
 a digital receiver which receives digital broadcast signals; and
 a digital signal processor which processes the digital broadcast signals, detects an input resolution of the digital broadcast signals, and transmits the detected input resolution to the controller.

6. The broadcast receiving apparatus as claimed in claim 5, wherein the signal processor further comprises:
 an analog receiver which receives analog broadcast signals; and
 an analog signal processor which processes the analog broadcast signals, detects an input resolution of the analog broadcast signals, and transmits the detected input resolution to the controller.

7. The broadcast receiving apparatus as claimed in claim 1, wherein the signal processor comprises
 an analog receiver which receives analog broadcast signals; and
 an analog signal processor which processes the analog broadcast signals, detects an input resolution of the analog broadcast signals, and transmits the detected input resolution to the controller.

8. The broadcast receiving apparatus of claim 1, wherein the down-scaler down-scales the captured frame data by removing pixels in a certain area of the captured frame data.

9. The broadcast receiving apparatus of claim 1, wherein the down-scaler down-scales the captured frame data by removing a pixel from the captured frame data, the pixel having a value such that a pixel value difference between the pixel and its neighboring pixel is less than a predetermined threshold.

10. A method for capturing a broadcast signal, comprising:
 receiving broadcast signals and detecting an input resolution;
 capturing a certain frame data from the broadcast signals;
 checking an input resolution of the broadcast signals;
 down-scaling the captured frame data, if the input resolution of the received broadcast signals corresponding to the captured frame data is lower than an output resolution, and storing the down-scaled frame data in a predetermined storage unit; and
 storing the captured frame data in the predetermined storage unit without down-scaling the captured frame data, if the input resolution of the received broadcast signals corresponding to the captured frame data is higher than the output resolution.

11. The method as claimed in claim 10, further comprising:
processing the received broadcast signals;
scaling the processed broadcast signals to the output resolution; and
storing the scaled broadcast signals in a frame buffer in sequence.

12. The method as claimed in claim 11, wherein the checking an input resolution comprises:
comparing the input resolution with the output resolution.

13. The method as claimed in claim 9, wherein the receiving broadcast signals and detecting an input resolution receives either an analog broadcast signal or a digital broadcast signal and detects an input resolution of the received broadcast signal.

14. The method as claimed in claim 13, wherein, when a capture command is input, capturing a certain frame data from the broadcast signals captures a frame data corresponding to a point of time when the capture command is input, from the frame data of the broadcast signals stored in the frame buffer.

15. The method of claim 10, wherein the down-scaling the captured frame data comprises removing pixels in a certain area of the captured frame data.

16. The method of claim 10, wherein the down-scaling the captured frame data comprises removing a pixel from the captured frame data, the pixel having a value such that a pixel value difference between the pixel and its neighboring pixel is less than a predetermined threshold.

* * * * *